United States Patent
Talley et al.

(10) Patent No.: US 7,787,899 B1
(45) Date of Patent: Aug. 31, 2010

(54) DYNAMIC ADJUSTMENT OF THE PILOT-CHANNEL, PAGING-CHANNEL, AND SYNC-CHANNEL TRANSMISSION-POWER LEVELS BASED ON FORWARD-LINK AND REVERSE-LINK RF CONDITIONS

(75) Inventors: Ryan S. Talley, Overland Park, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 716 days.

(21) Appl. No.: 11/681,867

(22) Filed: Mar. 5, 2007

(51) Int. Cl.
*H04B 7/00* (2006.01)
(52) U.S. Cl. .................. 455/522; 455/69; 455/450; 455/453; 455/452.1
(58) Field of Classification Search ............ 455/522, 455/69, 420, 424, 423, 450, 452.1, 452.2, 455/453, 464, 10, 13.4, 509, 513, 515, 67.11, 455/67.13, 67.16, 114.2, 115.1, 115.3, 115.4; 370/311, 342
See application file for complete search history.

(56) References Cited

U.S. PATENT DOCUMENTS

| | | | |
|---|---|---|---|
| 6,678,257 B1 | 1/2004 | Vijayan et al. | |
| 6,785,247 B1 * | 8/2004 | Lee | 370/311 |
| 6,963,750 B1 | 11/2005 | Cheng et al. | |
| 7,395,058 B1 * | 7/2008 | Kalofonos et al. | 455/423 |
| 7,437,176 B1 * | 10/2008 | Ribas et al. | 455/522 |
| 7,466,682 B1 * | 12/2008 | Ribas et al. | 370/342 |
| 2003/0134655 A1 | 7/2003 | Chen et al. | |
| 2004/0203809 A1 * | 10/2004 | Au et al. | 455/450 |
| 2006/0209721 A1 | 9/2006 | Mese et al. | |
| 2006/0247923 A1 * | 11/2006 | Chandran et al. | 704/211 |
| 2009/0024387 A1 * | 1/2009 | Chandran et al. | 704/226 |

OTHER PUBLICATIONS

Non-Final Office Action from U.S. Appl. No. 11/080,768, mailed Jan. 30, 2008.
Unpublished U.S. Appl. No. 11/688,135, entitled "Dynamic Adjustment of Forward-Link Traffic-Channel Power Levels Based on Forward-Link RF Conditions," filed Mar. 19, 2007 in the name of inventor Andrew M. Wurtenberger et al.

* cited by examiner

*Primary Examiner*—Tan Trinh (57) ABSTRACT

Methods and systems are provided for dynamic adjustment of the pilot-channel, paging-channel, and sync-channel transmission-power levels based on forward-link and reverse-link RF conditions. In an exemplary embodiment, a base station provides service on a carrier in a wireless coverage area, and computes both an $E_c/I_{or}$ value and a reverse noise rise (RNR) value for the carrier. Based at least in part on the $E_c/I_{or}$ value and at least in part on the RNR value, the base station adjusts at least one of a pilot-channel power level, a paging-channel power level, and a sync-channel power level for the carrier. As an example, if (a) $E_c/I_{or}$ is above a first threshold and (b) RNR is below a second threshold, the base station may increase all three of the power levels, so as to improve service quality and coverage, among other advantages.

22 Claims, 4 Drawing Sheets

DYNAMIC ADJUSTMENT OF THE PILOT-CHANNEL, PAGING-CHANNEL, AND SYNC-CHANNEL TRANSMISSION-POWER LEVELS BASED ON FORWARD-LINK AND REVERSE-LINK RF CONDITIONS

BACKGROUND

1. Technical Field

The present invention relates to wireless communications, and, more particularly, to managing base-station transmission power in wireless networks.

2. Description of Related Art a. CDMA Networks Generally

Many people use mobile stations, such as cell phones and personal digital assistants (PDAs), to communicate with cellular wireless networks. These mobile stations and networks typically communicate with each other over a radio-frequency (RF) air interface according to a wireless communication protocol such as Code Division Multiple Access (CDMA), perhaps in conformance with one or more industry specifications such as IS-95 and IS-2000. Wireless networks that operate according to these specifications are also referred to as "1xRTT (1x) networks," which stands for "Single Carrier Radio Transmission Technology". These networks (referred to herein as "CDMA networks") typically provide communication services such as voice, Short Message Service (SMS) messaging, and packet-data communication.

Typical CDMA networks include a plurality of base stations, each of which provide one or more wireless coverage areas, such as cells and sectors. As a general matter, sectors are used herein as examples of wireless coverage areas. When a mobile station is positioned in a sector, it can communicate over the RF air interface with the base station, and in turn over one or more circuit-switched and/or packet-switched signaling and/or transport networks to which the base station provides access. The base station and the mobile station conduct these communications over a frequency known as a carrier. Note that base stations may provide service in a sector on one carrier, or on more than one, and further that a given instance of a given carrier in a given sector may be referred to herein as a "sector/carrier."

Communication, including voice and packet-data communication, between the mobile station and the base station is separated into forward-link communication (from the base station to the mobile station) and reverse-link communication (from the mobile station to the base station). And each carrier over which this communication takes place is typically actually a pair of distinct frequencies—one for the forward link and the other for the reverse link. This approach is known as frequency division duplex (FDD).

In a typical CDMA network, using a configuration known as radio configuration 3 (RC3), a base station can, on each sector/carrier, transmit forward-link data on a maximum of 64 distinct channels at any given time. Each of these 64 channels corresponds to a unique 64-bit code known as a Walsh code. Of these, typically, 61 channels are available for use as traffic channels (to carry user data), while the other 3 are reserved for administrative channels known as the pilot channel, the paging channel, and the sync channel.

In general, the pilot channel functions to alert mobile stations in a given sector of the presence of a service-providing base station. Typically, the pilot channel conveys a value known as a pseudorandom number (PN) offset, which identifies the sector; in particular, by being offset from CDMA system time by a certain amount of time, the pilot channel conveys the PN offset. Mobile stations generally use the pilot channel to coherently detect and demodulate the signal on a given sector/carrier. The paging channel is typically used to transmit overhead messaging, such as incoming-call and message-waiting pages, as well as SMS messages, to mobile stations. The paging channel typically also broadcasts values known as the system identification code (SID) and the network identification code (NID), which, taken together, help identify a given sector. The sync channel generally provides information that enables the base station and mobile stations to be precisely synchronized on CDMA system time.

When a base station instructs a mobile station to use a particular traffic channel for a particular communication session, the base station does so by instructing the mobile station to tune to a particular one of those 64-bit Walsh-coded traffic channels. It is over that assigned traffic channel that the base station will transmit forward-link data to the mobile station during the ensuing communication session. Note that, in addition to including the forward-link channel, the traffic channel also includes a corresponding Walsh-coded reverse-link channel, over which the mobile station transmits data to the base station. These traffic channels may be used for different types of communication, among which are second-generation (2G) voice, 2G data, third-generation (3G) voice, and 3G data.

b. Forward-Link Transmission-Power Management i. Forward-Link Frame Error Rate (FFER)

In CDMA networks, the transmitting power of a base station on a given sector/carrier is divided among the mobile stations to which the base station is transmitting voice data and/or packet data on traffic channels, as well as among the pilot, paging, and sync channels mentioned above. With respect to mobile stations that engage in 3G voice and 3G data communications, the amount of power that the base station allocates to the transmission to any one mobile station is based on a number of factors, one of which is known as the forward-link frame error rate (FFER). Note that, in CDMA networks, data is transmitted from the base station to the mobile station (and vice versa) in data units that are known as frames.

Some of the frames received by mobile stations contain errors as a result of imperfect transfer from the base station, while some do not. The FFER is a ratio of the number of error-containing frames that the mobile station receives to the total number of frames that the mobile station receives, over a given time period. Note that the FFER calculations often also take into account frames that are not received at all by the mobile station. And, other things being more or less equal, the more power that the base station allocates to a given mobile station, the lower the mobile station's FFER will be. In operation, a mobile station reports its FFER to the base station, and the base station adjusts the power allocated to that mobile station accordingly. This back-and-forth calibration is conducted in an attempt to keep the mobile station's FFER at or below what is deemed to be an acceptable threshold, which typically will be around 2%.

More particularly, the mobile station periodically (e.g. once every 100 or 200 frames) computes its FFER, and reports it to the base station. The base station then adjusts its transmission power accordingly for that mobile station's assigned traffic channel. If the FFER is too high with respect to what is deemed to be an acceptable threshold, the base station increases transmission power in an effort to reduce the FFER. If the FFER is below the threshold, the base station may allocate less power to that mobile station, to have more available for other mobile stations. Again, this process is conducted in an attempt to keep the mobile station's FFER at or just below the acceptable threshold, often referred to as the "FFER target."

Note that different situations may present themselves on a given sector/carrier at different times. For one, the number of mobile stations using traffic channels can vary between just a few, such as 10, to a larger number, such as 30, and perhaps approach the upper bound of 61 (assuming RC3). And, as stated, the power that the base station allocates for transmission to these mobile stations can vary. In particular, variables such as terrain, weather, buildings, other mobile stations, other interference, and distance from the base station can affect the FFER that each mobile station reports, and thus the amount of power the base station allocates for each mobile station. Since base stations have a finite amount of power that they can allocate to the mobile stations on a sector/carrier, increasing the transmission power to some or all of those mobile stations (to keep their FFERs low) generally results in the base station being able to serve fewer mobile stations on that sector/carrier. That is, it reduces capacity on the sector/carrier.

ii. The Logarithmic Ratio $E_c/I_{or}$

As explained, in CDMA networks, a given base station has a finite amount of power for transmitting on each sector/carrier on which it provides service. The base station divides this power among any active traffic channels (over which it is transmitting voice and/or packet data to mobile stations), as well as among the pilot, paging, and sync channels. Periodically, for a given sector/carrier, the base station calculates a ratio of (a) the power it is allocating for transmitting the pilot channel (the "pilot-channel power level") with (b) the power it is allocating for transmitting all (i.e. pilot, paging, sync, and traffic) channels (the "all-channel power level").

This ratio is a base-10 logarithmic one, and is known as "$E_c/I_{or}$." The pilot-channel power level is referred to as "$E_c$"—"energy per chip." The all-channel power level is referred to as "$I_{or}$". $E_c$ and $I_{or}$ can each be expressed in Watts (W), milliwatts (mW), or any other suitable units of measure. Note that $E_c$ and $I_{or}$ are often expressed as base-10 logarithmic ratios themselves, with respect to a reference power level of 1 mW. In that case, $E_c$ and $I_{or}$ would each typically be expressed using the unit "dBm," where "dB" indicates decibels and "m" indicates the reference power level. So, $E_c$ can be expressed as the base-10 logarithmic ratio of the pilot-channel power level (in mW) and 1 mW. And $I_{or}$ can be expressed as the base-10 logarithmic ratio of the all-channel power level (in mW) and 1 mW.

$E_c/I_{or}$ is typically expressed as the base-10 logarithmic ratio of the pilot-channel power level and the all-channel power level, each of which may be measured in Watts. As such, the typical unit of measure for $E_c/I_{or}$ is the decibel (dB). As an example, if a base station were allocating about 2 W (2000 mW) for the pilot channel, $E_c$ would be about 33 dBm, calculated as 10*log((2000 mW)/(1 mW)). And if the base station were allocating a total of about 10 W (10,000 mW) for the pilot, paging, sync, and active traffic channels, $I_{or}$ would be about 40 dBm, calculated as 10*log((10000 mW)/(1 mW)). In this example, $E_c/I_{or}$ would be about −7 dB, calculated as 10*log((2 W)/(10 W)). Note that $E_c/I_{or}$ will always be negative, as long as at least some power is allocated for any one or any combination of the paging, sync, and traffic channels.

As another example, a typical base station may have 16 W of power that it can potentially use for transmitting all channels on a sector/carrier, and may allocate 15% (2.4 W) of that for the pilot channel, 10% (1.6 W) for the paging channel, and 5% (0.8 W) for the sync channel. When that base station is not serving any mobile stations on active traffic channels on the sector/carrier, i.e. when the sector/carrier is "unloaded," $E_c/I_{or}$ would be approximately −3 dB, calculated as 10*log((2.4 W)/(4.8 W)), which, then, would be about as high as $E_c/I_{or}$ gets. Thus, for reference, anything close to −3 dB may be considered relatively high for $E_c/I_{or}$.

And when that same base station is at or near capacity ("fully loaded"), the 15% of its potential sector/carrier power that it is allocating for the pilot channel would shrink from being half of its power output on the sector/carrier (in the unloaded scenario) to, not surprisingly, being about 15% of its power output. This would yield an $E_c/I_{or}$ of approximately −8 dB, calculated as 10*log((2.4 W)/(16 W)), which, then would be about as low as $E_c/I_{or}$ gets. Thus, for reference, anything close to −8 dB may be considered relatively low for $E_c/I_{or}$. In fact, a typical base station may stop accepting new mobile stations on a sector/carrier once $E_c/I_{or}$ degrades to about −8 dB. Thus, $E_c/I_{or}$ can impact sector/carrier capacity as well.

When $E_c/I_{or}$ is relatively high, this could mean a number of things. For example, there could be only a few mobile stations on the sector/carrier (i.e. the sector/carrier is lightly loaded), which would generally lead to a higher ratio of pilot-channel power allocation to total power allocation (with relatively few traffic channels to which to allocate power). Instead or in addition, it could mean that RF conditions are favorable, such that no (or relatively few) mobile stations are experiencing a poor FFER. In that situation, there would be no (or relatively few) mobile stations inducing the base station to increase power on the traffic channels. This would tend to keep the value of $E_c/I_{or}$ relatively high. And other possibilities exist as well.

When $E_c/I_{or}$ is relatively low, this also could mean a number of things. For example, there could be a relatively high number of mobile stations on the sector/carrier (i.e. the sector/carrier is heavily loaded), and thus a high number of active traffic channels contributing to a high value of $I_{or}$, and thus a low value of $E_c/I_{or}$. Instead or in addition, it could mean that RF conditions are poor (e.g., due to terrain, weather, interference, etc.); in that case, mobile stations would likely experience poor FFER, and induce the base station to increase power on the traffic channels, which would contribute to a higher $I_{or}$ and thus a lower $E_c/I_{or}$. And other possibilities exist as well.

c. Reverse Noise Rise (RNR)

In general, interference can be—and often is—present on the reverse link of a given sector/carrier. That is, on the given sector/carrier, a base station will receive transmissions not only from mobile stations that are operating on that sector/carrier, but will also often receive transmissions on that frequency from other mobile stations, other transmitting devices, and/or any other sources of interference on that frequency in that geographical area. At a given moment, the sum total of what a base station is receiving on a given sector/carrier (i.e. a given frequency)—including transmissions from mobile stations operating on that sector/carrier, as well as from all other sources—is known as the "reverse noise" on that sector/carrier.

Quite frequently (e.g., once per frame (i.e. once every approximately 26.67 ms)), base stations compute a value known as "reverse noise rise" (RNR) for a given sector/carrier, which is the difference between (i) the reverse noise that the base station is currently detecting on the sector/carrier and (ii) a baseline level of reverse noise for the sector/carrier. Thus, the base station computes how far the reverse noise has risen above that baseline.

For the baseline level, CDMA networks may use a value such as the lowest measurement of reverse noise on the sector/ carrier in the previous 24 hours, or perhaps an average of the 24-hour lows over the previous week, or perhaps some other value. Incidentally, some networks, including Evolution Data Optimized (EV-DO) networks, may periodically use what is known as a silent interval, which is a coordinated time period during which mobile stations know not to transmit anything to the base station. The base station can then measure whatever else is out there. As such, the baseline would correspond to the amount of reverse noise when the sector/carrier is unloaded. And other reverse-link-noise levels could be used as a baseline.

Other things being more or less equal, the lower the RNR is at a given moment, the more favorable the RF environment is for communication between mobile stations and the base station at that time. Correspondingly, the higher the RNR, the less favorable the RF environment is. Also, a low RNR generally corresponds to a sector/carrier being lightly loaded, in other words that is supporting communications for a relatively low number of mobile stations. A high RNR, as one might expect, generally corresponds to a sector/carrier being heavily loaded, in other words that is supporting communications for a relatively high number of mobile stations.

SUMMARY

Methods and systems are provided for dynamic adjustment of the pilot-channel, paging-channel, and sync-channel transmission-power levels based on forward-link and reverse-link RF conditions. In one aspect, an exemplary embodiment may take the form of a method. In accordance with the method, a base station provides service on a carrier in a wireless coverage area. The base station computes both (a) an $E_c/I_{or}$ value for the carrier and (b) a reverse noise rise (RNR) value for the carrier. Based at least in part on the computed $E_c/I_{or}$ value and at least in part on the computed RNR value, the base station adjusts at least one of the pilot-channel power level for the carrier, the paging-channel power level for the carrier, and the sync-channel power level for the carrier.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

In accordance with the present invention, a base station, such as a CDMA base station, adjusts the forward-link power levels used for transmitting the pilot, paging, and sync channels on a given sector/carrier based on computed values of $E_c/I_{or}$ and RNR. As a general point, in a typical CDMA network, the pilot-channel power level, the paging-channel power level, and the sync-channel power level are independently-modifiable parameters. In prior implementations, these three power levels are set to static values, ostensibly designed for average loading conditions on a sector/carrier. This results in a misfit in many situations.

Thus, as an example in accordance with the present invention, a base station may detect at a given moment on a given sector/carrier both that $E_c/I_{or}$ is relatively high and that RNR is relatively low. Both of these conditions are generally associated with light-to-moderate loading on a sector/carrier. In response to detecting this dual condition, the base station may increase the pilot-channel, paging-channel, and/or sync-channel power levels. Note that, preferably, the base station will increase all three in such a manner so as to maintain the proportional relationship between and among these power-level values. This increase in the transmission power level will generally help improve service quality and increase the geographical area covered by the given sector/carrier, among other advantages.

The present invention thus enables a service provider to take advantage of times when excess capacity (i.e. power) is available by dynamically increasing the pilot-channel, paging-channel, and sync-channel power levels in order to achieve improved and increased coverage for a given sector/carrier. Rather than setting these power levels to static values that may not be suited to prevailing RF conditions, the present invention makes these power levels dynamically responsive to the RF conditions on both the forward and reverse link. The present invention reduces the amount of unused transmission power, instead taking advantage of this power to serve users that the sector/carrier may not otherwise be able to serve.

In response to detecting other types of RF conditions, such as both a relatively low $E_c/I_{or}$ and a relatively high RNR for example, the base station may decrease the transmission-power level for the pilot channel, paging channel, and/or sync channel. Again, preferably, the base station will decrease all three power levels in such a manner so as to maintain the proportional relationship between and among these power-level values. Furthermore, it could be the case that, should the base station detect one but not the other of a relatively high $E_c/I_{or}$ and a relatively low RNR, the base station may decide to maintain the current transmission-power levels. And other possibilities certainly exist as well.

In some embodiments, the base station may determine whether $E_c/I_{or}$ is relatively high or relatively low by determining whether $E_c/I_{or}$ is greater than or less than a forward-link-RF threshold value, which may be set to −6 dB, as an example. Furthermore, the base station may determine whether RNR is relatively high or relatively low by determining whether RNR is greater than or less than a reverse-link-RF threshold, which may be set to 5 dB, as an example. And other threshold values could certainly be used, as could more than two ranges of $E_c/I_{or}$ and/or more than two ranges of RNR. That is, a table of any number of $E_c/I_{or}$ ranges and any number RNR ranges could be used to set forward-link pilot-channel, paging-channel, and sync-channel transmission-power levels, in accordance with the present invention.

Furthermore, the above-described dynamic adjustment of pilot-channel, paging-channel, and sync-channel power levels based on both forward-link and reverse-link RF conditions will preferably be carried out on a periodic basis, such as once every 10 seconds, once every 30 seconds, once every minute, or once per some other time interval, which itself may vary. For example, the power levels may be adjusted more frequently during known times of day that generally correspond to heavy loading on a sector/carrier, or maybe more frequently on sector/carriers that typically experience heavy loading, and not as frequently on others. And other examples are possible as well.

2. Exemplary Architecture a. Exemplary Communication System

Figure 1:
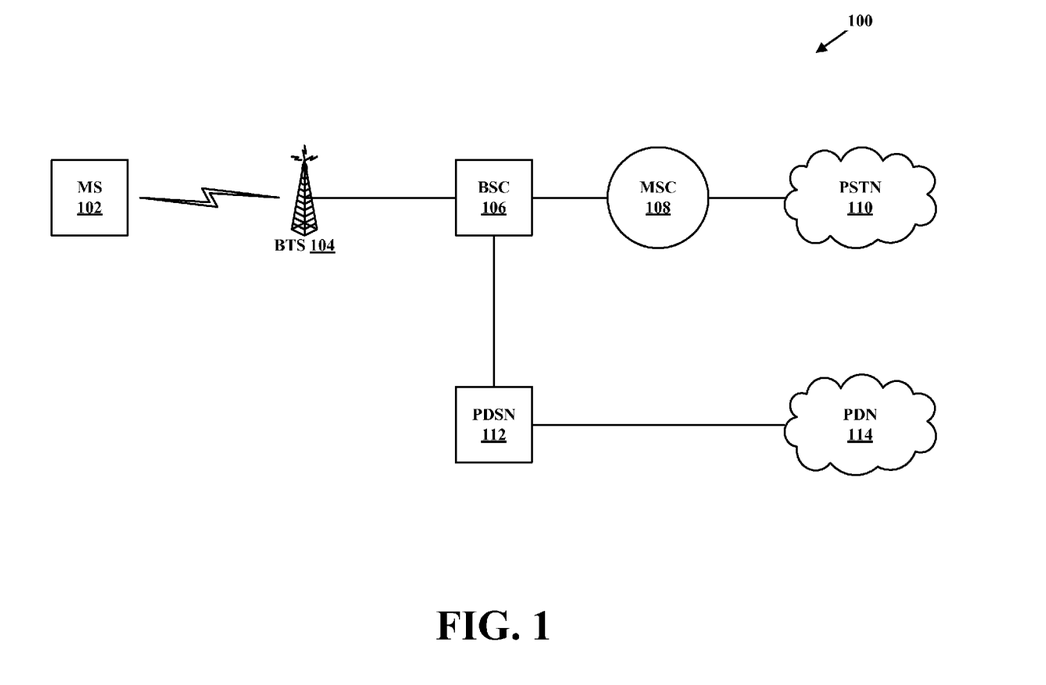
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present, such as additional mobile stations in communication with BTS 104, additional BTSs in communication with BSC 106, and additional BSCs in communication with MSC 108; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Note that the combination of BTS 104 and BSC 106 may be considered—and referred to herein as—a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present invention.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations, such as mobile station 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

3. Exemplary Operation i. A First Exemplary Method

Figure 2:
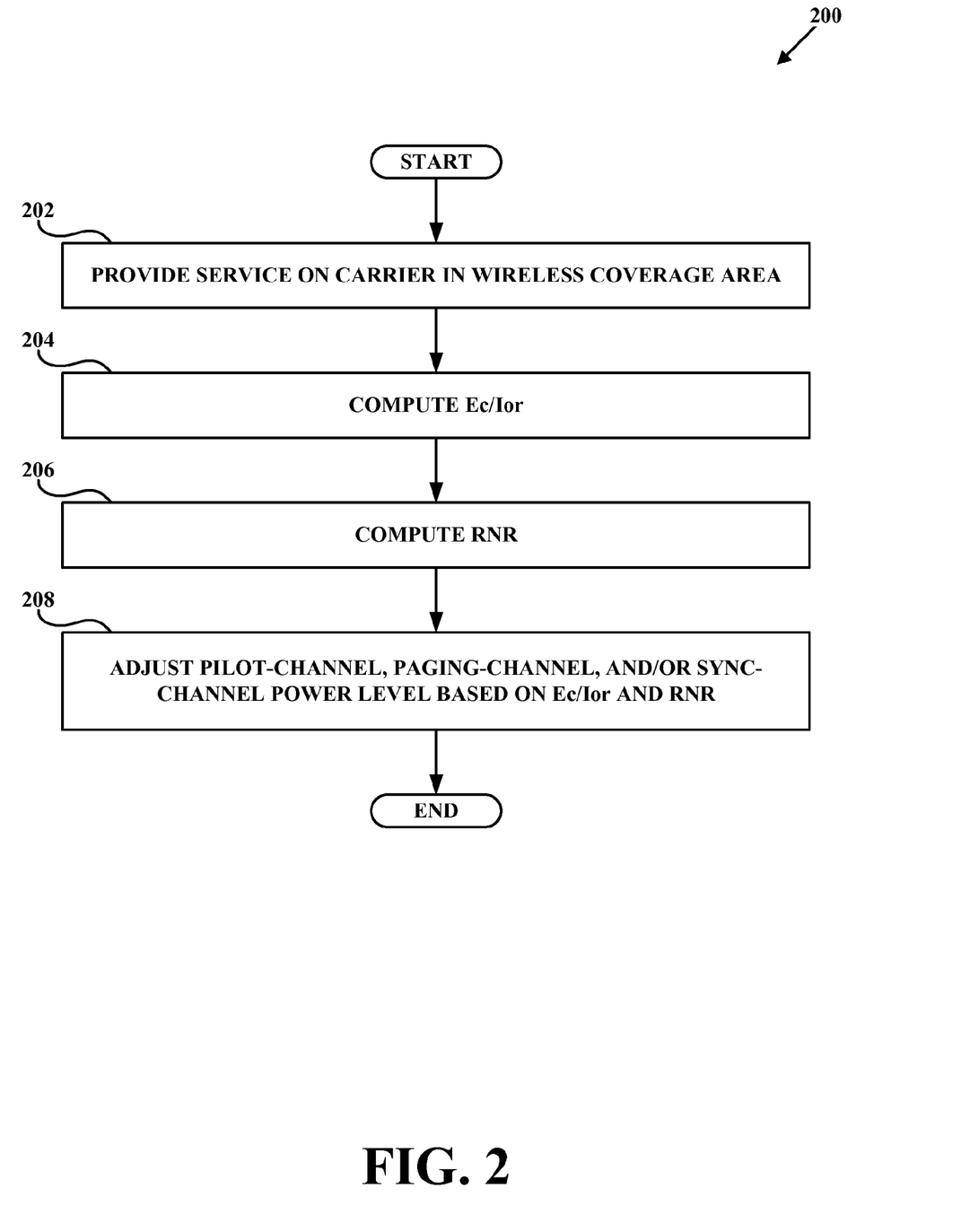
FIG. 2 is a flowchart of a first exemplary method, in accordance with exemplary embodiments.

FIG. 2 depicts a flowchart of a method, in accordance with exemplary embodiments. As shown in FIG. 2, method 200 begins at step 202, when BTS 104 provides service on a carrier in a wireless coverage area. At step 204, BTS 104 computes an $E_c/I_{or}$ value for the carrier. At step 206, BTS 104 computes an RNR value for the carrier. At step 208, BTS 104 adjusts the pilot-channel, paging-channel, and/or sync-channel power levels for the carrier based at least in part on the computed $E_c/I_{or}$ value and at least in part on the computed RNR value. These steps are further explained in the following subsections.

Note that method 200 is described herein as being carried out by BTS 104. This, however, is not required. In general, method 200 can be carried out by any one or any combination of BTS 104, BSC 106, MSC 108, PDSN 110, a device known as a radio network controller, a device known as an access node, a computer, a server, and another network entity. Note as well that, as described herein, method 200 is preferably carried out on a periodic basis, such as once every 30 seconds, once every minute, or once per some other time interval, so as to dynamically adjust the pilot-channel, paging-channel, and/or sync-channel power levels for a given sector/carrier to changing RF conditions.

(1) Provide Service on a Carrier in a Wireless Coverage Area

At step 202, BTS 104 provides service on a carrier in a wireless coverage area. This service may be or include CDMA service, and the wireless coverage area could be or include a cell or a sector. For the balance of this description of FIG. 2, a sector will be used as an exemplary wireless coverage area. Furthermore, the description of step 202 as providing service on a carrier in the sector is in no way meant to exclude the possibility of providing service on more than one carrier in the sector. As above, the carrier to which step 202 refers may be referred to in this description of FIG. 2 as the sector/carrier.

(2) Compute $E_c/I_{or}$

At step 204, BTS 104 computes an $E_c/I_{or}$ value for the sector/carrier. As explained above, step 204 may involve computing the logarithmic ratio of two power levels. The first, referred to herein as the pilot-channel power level, is the power level at which BTS 104 is transmitting the pilot channel on the sector/carrier. The second, referred to herein as the all-channel power level, is the collective power level at which BTS 104 is transmitting the pilot channel, the paging channel, the sync channel, and any active traffic channels. In general, computation of $E_c/I_{or}$ by a CDMA (or other) base station is known in the art.

(3) Compute RNR

At step 206, BTS 104 computes an RNR value for the sector/carrier. As explained above, step 206 may involve measuring a current level of noise on the reverse link on the sector/carrier, and then computing the RNR value as the difference between that current level of noise on the reverse link and a baseline level of noise on the reverse link. As also explained above, the baseline level could correspond to the daily minimum level of reverse noise, the average of the daily minimums over the previous week, the amount of reverse-link noise present when the wireless coverage area is unloaded, i.e. is not serving any mobile stations, or perhaps some other measure of reverse noise. In general, computation of RNR by a CDMA (or other) base station is known in the art.

(4) Adjust Pilot-Channel, Paging-Channel, and/or Sync-Channel Power Levels Based on $E_c/I_{or}$ and RNR At step 208, BTS 104 adjusts the pilot-channel, paging-channel, and/or sync-channel power levels—and preferably all three—for the sector/carrier based at least in part on the computed $E_c/I_{or}$ value and at least in part on the computed RNR value. In one embodiment, BTS 104 may maintain two different threshold values: a forward-link RF threshold and a reverse-link RF threshold. Thus, step 208 may involve BTS 104 (a) comparing the computed $E_c/I_{or}$ value with the forward-link RF threshold and (b) comparing the computed RNR value with the reverse-link RF threshold. As examples, the forward-link RF threshold could be set to 6 dB, and the reverse-link RF threshold could be 5 dB, though other values could be used.

If BTS 104 determines that (a) the computed $E_c/I_{or}$ value is greater than the forward-link RF threshold and (b) the computed RNR value is less than the reverse-link RF threshold, then BTS 104 may increase the pilot-channel, paging-channel, and/or sync-channel power levels, and preferably all three. This situation is depicted as row 406 of FIG. 4, which generally depicts four different situations in accordance with exemplary embodiments, with the computed $E_c/I_{or}$ and RNR as inputs 402 (to the left of the dashed vertical line 414), and a decision related to the power levels as the output 404 (to the right of line 414). The other three situations are numbered 408, 410, and 412.

If BTS 104 determines that (a) the computed $E_c/I_{or}$ value is less than the forward-link RF threshold and (b) the computed RNR value is greater than the reverse-link RF threshold, then BTS 104 may decrease the pilot-channel, paging-channel, and/or sync-channel power levels, and preferably all three. This is depicted as situation 408 of FIG. 4. Note that situation 410 involves both $E_c/I_{or}$ and RNR being above their respective thresholds, while situation 412 involves both $E_c/I_{or}$ and RNR being below their respective thresholds. In each of these situations 410 and 412, the output 404 is to maintain the current levels of transmission power. And other possibilities exist as well with respect to how to adjust the pilot-channel, paging-channel, and/or sync-channel power levels based on various combinations of $E_c/I_{or}$ and RNR.

Figure 4:
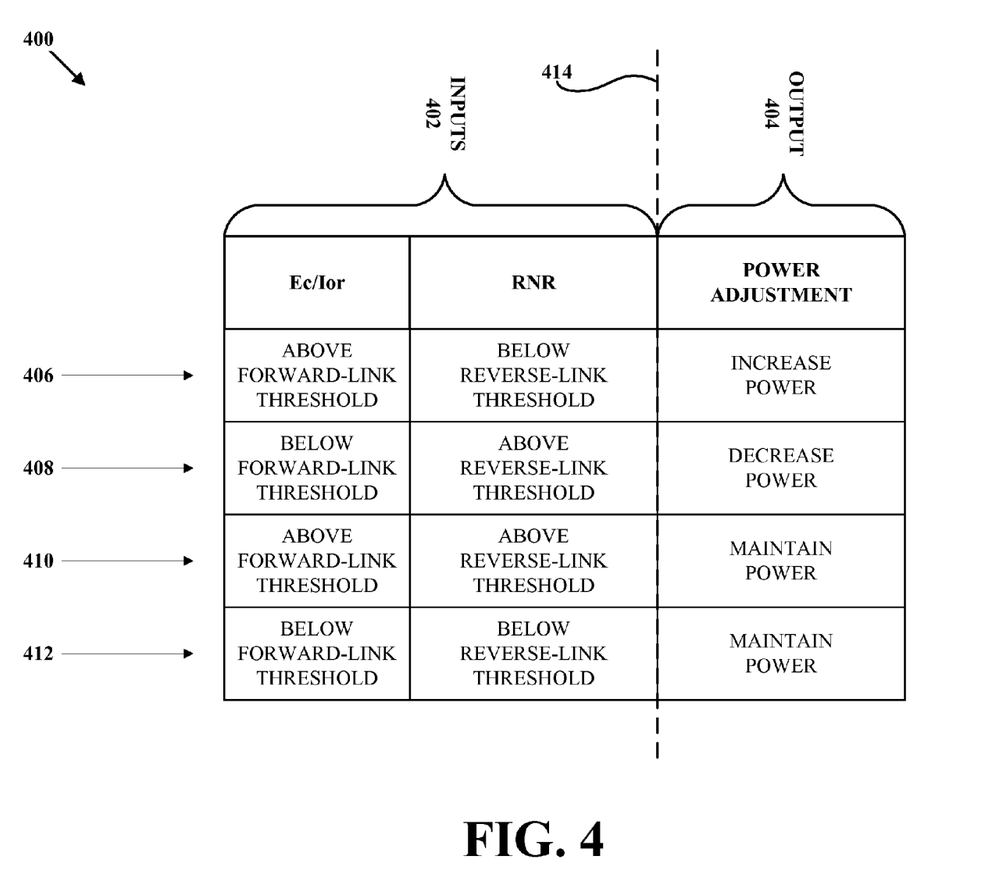
FIG. 4 is a table showing several exemplary situations, in accordance with exemplary embodiments.

In general, favorable RF conditions are associated with high $E_c/I_{or}$ and low RNR, which corresponds to situation 406, while poor RF conditions are associated with low $E_c/I_{or}$ and high RNR, which corresponds to situation 408. And the use of only two ranges (i.e. above or below their respective threshold) for $E_c/I_{or}$ and for RNR is exemplary only; any number of value ranges could be used for either or both of $E_c/I_{or}$ and RNR without departing from the scope or spirit of the present invention.

Moreover, it is typically preferable—and perhaps required in certain implementations—to keep the values of the pilot-channel power level, paging-channel power level, and sync-channel power level in a certain proportional relationship with each other. For example, the pilot-channel power level may initially be set equal to 15% of the total power available to BTS 104 for transmissions on the sector/carrier. In that scenario, the paging-channel power level may be set to 10% of that same total-power value, while the sync-channel power level may be set to 5% of the total. In accordance with the power-level adjustments contemplated by the present invention, any increase or decrease to these values would preferably be done in such a way as to maintain that proportional relationship. Some possible adjustments could include doubling all three power levels, halving all three, multiplying all three by a factor of 1.25 or 0.75, etc.

Note that, in the completely unloaded scenario, increasing or decreasing these three power levels in this proportional way has no impact on the value of $E_c/I_{or}$. In a scenario involving at least one active traffic channel, however, and assuming the power levels allocated to the traffic channel(s) remain(s) constant, then increasing all three power levels proportionally results in an increase to the value of $E_c/I_{or}$, while decreasing all three power levels proportionally results in a decrease to the value of $E_c/I_{or}$.

ii. A Second Exemplary Method

Figure 3:
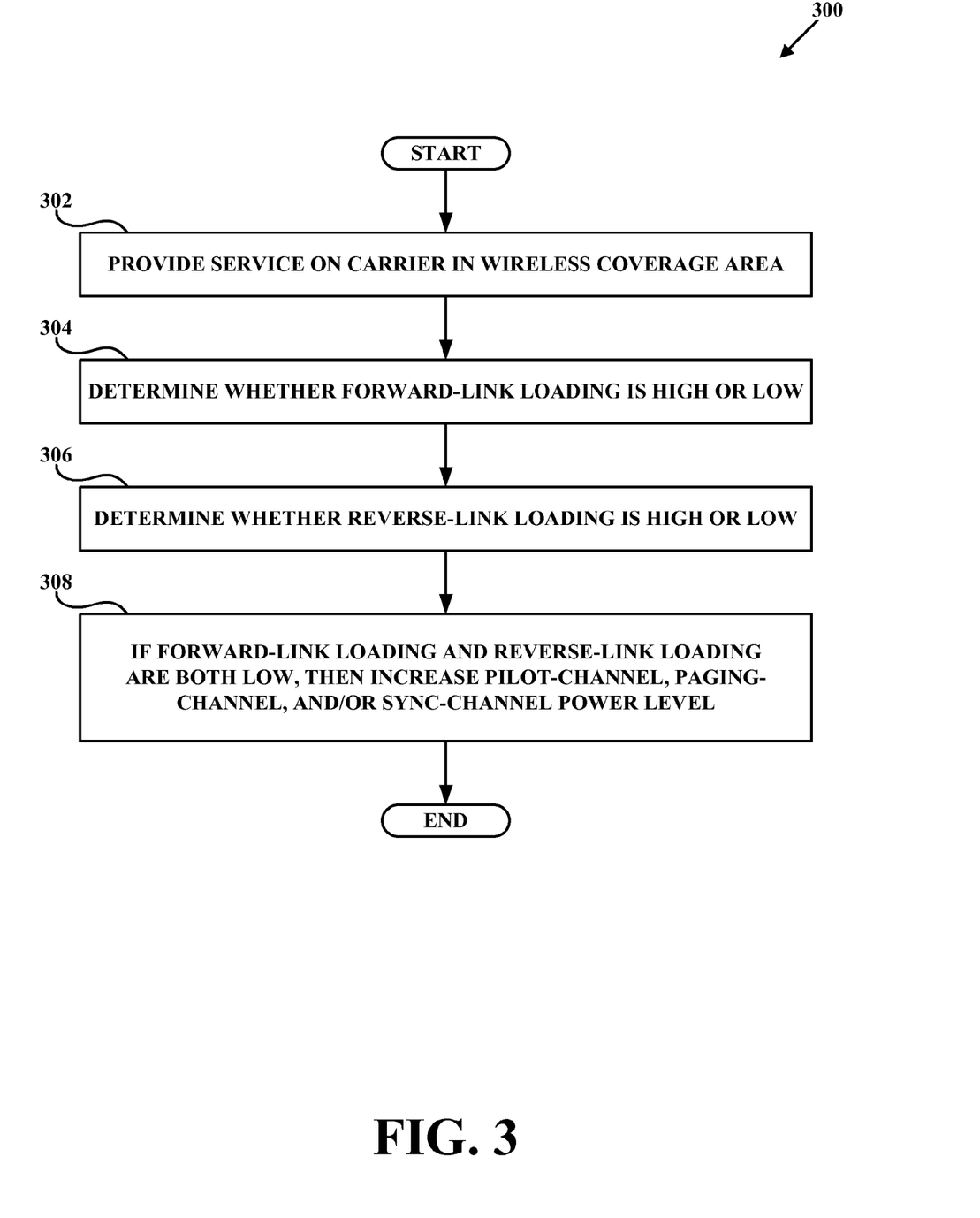
FIG. 3 is a flowchart of a second exemplary method, in accordance with exemplary embodiments.

FIG. 3 depicts a flowchart of a method, in accordance with exemplary embodiments. Note that method 300 of FIG. 3 is similar in some respects to method 200 of FIG. 2, and thus is not described in as great of detail. Like method 200, method 300 is described as being carried out by BTS 104, though method 300 could be carried out by any one or any combination of the entities described as possibilities for carrying out method 200, and/or any other entity or entities.

As shown in FIG. 3, method 300 begins at step 302, when BTS 104 provides service on a carrier in a wireless coverage area. This service includes both a forward link and a reverse link, and the forward link includes a pilot channel, a paging channel, and a sync channel. In accordance with method 300, BTS 104 initially transmits the pilot channel at a first power level, the paging channel at a second power level, and the sync channel at a third power level.

At step 304, BTS 104 determines whether a level of loading on the forward link is high or low. Note that, in both steps 304 and 306, loading generally refers to whether a relatively low number or a relatively high number of mobile stations are communicating on active traffic channels on the sector/carrier at the relevant time. As one example, step 304 may involve computing $E_c/I_{or}$ as described herein, where a high value of $E_c/I_{or}$ (i.e. relatively little power used for traffic-channel transmissions) would be associated with low loading, while a low value of $E_c/I_{or}$ (i.e. relatively high power used for traffic-channel transmissions) would be associated with high loading. Other loading metrics could be used as well, including examining how many traffic channels are assigned, paging-channel-timeslot usage, and/or any others.

At step 306, BTS 104 determines whether a level of loading on the reverse link is high or low. As one example, step 306 may involve computing RNR as described herein, where a low level of RNR (relatively low level of transmissions (e.g. traffic-channel transmissions) coming in on the reverse link) would be associated with a low level of loading, while a high level of RNR (relatively high level of transmissions (e.g. traffic-channel transmissions) coming in on the reverse link) would be associated with a high level of loading. And other metrics of reverse-link loading could be used as well in step 306, such as the number of assigned traffic channels, and/or any other metric(s).

At step 308, if (a) the level of loading on the forward link is low (as determined in step 304) and (b) the level of loading on the reverse link is low (as determined in step 306), BTS 104 transmits (i) the pilot channel at a fourth power level, (ii) the paging channel at a fifth power level, and (i) the sync channel at a sixth power level, where the fourth power level is greater than the first power level, the fifth power level is greater than the second power level, and the sixth power level is greater than the third power level. That is, BTS 104 increases the transmission-power level for all three of the pilot, paging, and sync channels. BTS 104 may do so by, for example, doubling all three power levels.

If, however, (a) the loading on the forward link is high and (b) the loading on the reverse link is high, BTS 104 may adjust to transmitting (i) the pilot channel at a seventh power level, (ii) the paging channel at an eighth power level, and (i) the sync channel at a ninth power level, where the seventh power level is less than the first power level, the eighth power level is less than the second power level, and the ninth power level is less than the third power level. That is, BTS 104 may decrease the transmission-power level for all three of the pilot, paging, and sync channels. BTS 104 may do so by, for example, halving all three power levels.

If one of the forward-link load and the reverse-link is high and the other is low, BTS 104 may decide to keep the current levels of transmission power. And other possibilities exist as well. Note that it is contemplated that method 300, like method 200, and the present invention generally, would be carried out repeatedly on a periodic basis, so as to dynamically adjust the pilot-channel power level, the paging-channel power level, and/or the sync-channel power level—and preferably all three power levels—to the prevailing RF conditions over time.

4. Conclusion

Various exemplary embodiments have been described above. Those skilled in the art will understand, however, that changes and modifications may be made to those examples without departing from the scope of the claims.

What is claimed is:

1. A method comprising:
   providing service on a carrier in a wireless coverage area, the service comprising a forward link and a reverse link, the forward link comprising a pilot channel, a paging channel, and a sync channel, wherein providing service comprises initially transmitting (a) the pilot channel at a first power level, (b) the paging channel at a second power level, and (c) the sync channel at a third power level;
   determining whether a level of loading on the forward link is high or low;
   determining whether a level of loading on the reverse link is high or low; and
   if (a) the level of loading on the forward link is low and (b) the level of loading on the reverse link is low, then transmitting (i) the pilot channel at a fourth power level, (ii) the paging channel at a fifth power level, and (i) the sync channel at a sixth power level, wherein the fourth power level is greater than the first power level, the fifth power level is greater than the second power level, and the sixth power level is greater than the third power level.

2. The method of claim 1, further comprising:
   if (a) the level of loading on the forward link is high and (b) the level of loading on the reverse link is high, then transmitting (i) the pilot channel at a seventh power level, (ii) the paging channel at an eighth power level, and (i) the sync channel at a ninth power level, wherein the seventh power level is less than the first power level, the eighth power level is less than the second power level, and the ninth power level is less than the third power level.

3. The method of claim 2, wherein:
   the first power level, the second power level, and the third power level have a proportional relationship among each other; and
   the seventh power level, the eighth power level, and the ninth power level maintain that proportional relationship.

4. The method of claim 1, carried out by at least one of a base station, a base transceiver station, a base station controller, a radio network controller, and an access node.

5. The method of claim 1, wherein the service comprises code division multiple access (CDMA) service.

6. The method of claim 1, wherein the wireless coverage area comprises at least one of a cell and a sector.

7. The method of claim 1, wherein determining whether the level of loading on the forward link is high or low comprises computing an $E_c/I_{or}$ value for the carrier.

8. The method of claim 7, wherein determining whether the level of loading on the forward link is high or low further comprises:
    comparing the computed $E_c/I_{or}$ value with a forward-link radio-frequency (RF) threshold;
    determining that the level of loading on the forward link is low when the computed $E_c/I_{or}$ value is greater than the forward-link RF threshold; and
    determining that the level of loading on the forward link is high when the computed $E_c/I_{or}$ value is less than the forward-link RF threshold.

9. The method of claim 8, wherein the forward-link RF threshold is −6 dB.

10. The method of claim 7, wherein computing the $E_c/I_{or}$ value comprises computing a logarithmic ratio of the first power level and an all-channel power level, wherein the all-channel power level includes at least the first power level, the second power level, and the third power level.

11. The method of claim 10, wherein the all-channel power level further includes power allocated to transmitting one or more traffic channels.

12. The method of claim 1, wherein determining whether the level of loading on the reverse link is high or low comprises computing a reverse noise rise (RNR) value for the carrier.

13. The method of claim 12, wherein determining whether the level of loading on the reverse link is high or low further comprises:
    comparing the computed RNR value with a reverse-link RF threshold;
    determining that the level of loading on the reverse link is high when the computed RNR value is greater than the reverse-link RF threshold; and
    determining that the level of loading on the reverse link is low when the computed RNR value is less than the reverse-link RF threshold.

14. The method of claim 13, wherein the reverse-link RF threshold is 5 dB.

15. The method of claim 12, wherein computing the RNR value comprises:
    measuring a current level of noise on the reverse link; and
    computing the RNR value as the difference between the current level of noise on the reverse link and a baseline level of noise on the reverse link.

16. The method of claim 15, wherein the baseline level of noise on the reverse link corresponds to at least one of a minimum amount of reverse noise measured in the previous 24 hours, an average of 24-hour minimum levels of reverse noise over a previous 7-day period, and an amount of noise present when the wireless coverage area is unloaded.

17. The method of claim 1, wherein:
    the first power level, the second power level, and the third power level have a proportional relationship among each other; and
    the fourth power level, the fifth power level, and the sixth power level maintain that proportional relationship.

18. The method of claim 1, carried out on a periodic basis.

19. A base station comprising:
    a wireless-communication interface;
    a processor; and
    data storage containing instructions executable by the processor to:
        provide service on a carrier in a wireless coverage area, the service comprising a forward link and a reverse link, the forward link comprising a pilot channel, a paging channel, and a sync channel, wherein providing service comprises initially transmitting (a) the pilot channel at a first power level, (b) the paging channel at a second power level, and (c) the sync channel at a third power level;
        determine whether a level of loading on the forward link is high or low;
        determine whether a level of loading on the reverse link is high or low; and
        if (a) the level of loading on the forward link is low and (b) the level of loading on the reverse link is low, then transmit (i) the pilot channel at a fourth power level, (ii) the paging channel at a fifth power level, and (i) the sync channel at a sixth power level, wherein the fourth power level is greater than the first power level, the fifth power level is greater than the second power level, and the sixth power level is greater than the third power level.

20. The base station of claim 19, wherein the instructions to determine whether the level of loading on the forward link is high or low comprise instructions to:
    compute an $E_c/I_{or}$ value for the carrier;
    compare the computed $E_c/I_{or}$ value with a forward-link radio-frequency (RF) threshold;
    determine that the level of loading on the forward link is low when the computed $E_c/I_{or}$ value is greater than the forward-link RF threshold; and
    determine that the level of loading on the forward link is high when the computed $E_c/I_{or}$ value is less than the forward-link RF threshold.

21. The base station of claim 19, wherein the instructions to determine whether the level of loading on the reverse link is high or low comprise instructions to:
    compute a reverse noise rise (RNR) value for the carrier;
    compare the computed RNR value with a reverse-link RF threshold;
    determine that the level of loading on the reverse link is high when the computed RNR value is greater than the reverse-link RF threshold; and
    determine that the level of loading on the reverse link is low when the computed RNR value is less than the reverse-link RF threshold.

22. The base station of claim 19, arranged to carry out the recited functions on a periodic basis.

* * * * *